US00RE36522E

United States Patent [19]

Wallace et al.

[11] E Patent Number: Re. 36,522

[45] Reissued Date of Patent: Jan. 18, 2000

[54] METHOD AND APPARATUS FOR DYNAMICALLY INTERFACING WITH A PLURALITY OF PERIPHERAL PORTS

[75] Inventors: Steven J. Wallace; LaVaughn F. Watts, Jr., both of Austin, Tex.

[73] Assignee: Texas Instruments Incoporated

[21] Appl. No.: 09/177,447

[22] Filed: Sep. 30, 1998

Related U.S. Patent Documents

Reissue of:

[64] Patent No.: 5,745,788
Issued: Apr. 28, 1998
Appl. No.: 08/494,863
Filed: Jun. 26, 1995

U.S. Applications:

[63] Continuation of application No. 08/196,046, Feb. 14, 1994, abandoned, which is a continuation of application No. 07/424,853, Oct. 20, 1989, Pat. No. 5,317,707.

[51] Int. Cl.[7] ..... G06F 13/00

[52] U.S. Cl. ..... 710/19; 710/15; 710/102

[58] Field of Search ..... 710/15, 19, 102

[56] References Cited

U.S. PATENT DOCUMENTS

| | | | |
|---|---|---|---|
| 4,080,651 | 3/1978 | Cronshaw et al. | 711/160 |
| 4,310,879 | 1/1982 | Pandeya | 395/800.32 |
| 4,340,932 | 7/1982 | Bakula et al. | 711/2 |
| 4,472,771 | 9/1984 | Bienvenu et al. | 711/151 |
| 4,593,375 | 6/1986 | Gershenon | 341/94 |
| 4,639,862 | 1/1987 | Wada et al. | 710/22 |
| 4,750,136 | 6/1988 | Arpin et al. | 710/10 |
| 4,787,030 | 11/1988 | Harder et al. | 711/5 |
| 4,896,289 | 1/1990 | Svinicki et al. | 364/927.92 |
| 4,931,923 | 6/1990 | Fitch et al. | 395/500 |
| 4,943,966 | 7/1990 | Giunta et al. | 364/245.3 |
| 4,947,321 | 8/1990 | Spence et al. | 705/45 |
| 4,949,298 | 8/1990 | Nakanishi et al. | 711/2 |
| 4,999,787 | 3/1991 | McNally et al. | 710/103 |
| 5,003,506 | 3/1991 | Itaya | 711/172 |
| 5,210,855 | 5/1993 | Bartol | 395/500 |
| 5,280,599 | 1/1994 | Arai | 711/172 |
| 5,317,707 | 5/1994 | Wallace et al. | 710/19 |

*Primary Examiner*—Paul V. Kulik
*Attorney, Agent, or Firm*—Ronald O. Neerings; Richard L. Donaldson

[57] ABSTRACT

A method of dynamically interfacing an application processor with a plurality of peripheral ports is shown, including the use of an expanded memory interface for controlling a plurality of memory components for an application processor external to the interface. The application processor is connected to the expanded memory interface, which is in turn coupled to at least one status port to facilitate communication between the application processor and the status port.

20 Claims, 3 Drawing Sheets

METHOD AND APPARATUS FOR DYNAMICALLY INTERFACING WITH A PLURALITY OF PERIPHERAL PORTS

Matter enclosed in heavy brackets [ ] appears in the original patent but forms no part of this reissue specification; matter printed in italics indicates the additions made by reissue.

This a continuation of application Ser. No. 08/196,046 filed Feb. 14, 1994, now abandoned, which is a continuation of Ser. No. 07/424,853, filed Oct. 20, 1989, now U.S. Pat. No. 5,317,707.

FIELD OF THE INVENTION

The present invention relates generally to microprocessors and microcomputers, and specifically to an expanded memory interface for application microprocessors and microcomputers.

BACKGROUND OF THE INVENTION

The terms microprocessor and microcomputer often are used interchangeably even though a microprocessor technically does not have any memory on the same chip with the processor. A microcomputer, on the other hand, includes a processor and at least some memory on the same chip. Since the present invention can be utilized with both microprocessors and microcomputers the terms will be used interchangeably herein. It is to be understood, however that use of one term includes the other unless the context indicates otherwise.

Microprocessors running application program, such as DOS based programs, have the ability to directly address only a limited amount of conventional memory. In the case of DOS based application processors that limit is 1 megabyte (MB) of memory. This limit of memory can be expanded by using an Expanded Memory System (EMS). Such an EMS is disclosed in the "AST-Enhanced Expanded Memory Specification (EEMS) Technical Reference Manual", 000408-001 A. September, 1986. A similar EMS is disclosed in "The MS-DOS Encyclopedia", Microsoft Press, Redmond, Wash., 1988. Duncan, Ray General Editor.

In general an EMS is provided by mapping 16 KB pages of expanded memory into a 64 KB area called the page frame, above the 640 KB memory boundary within the conventional memory. The DOS kernel does not take part in expanded memory manipulations and does not use expanded memory for its own purposes. The manipulation and management of the expanded memory is performed by an EMS controller. Typically, however, EMS memory is usually conceived as a fixed mass of RAM permanently attached to the DOS processor and controlled by a discrete realization of the EMS controller.

Extended memory (EXT) is that memory storage at addresses above 1 MB that can be accessed directly by a microprocessor running in protected mode. Protected mode operating systems, such as XENIX and OS/2, can use extended memory for execution of programs. DOS based application programs, on the other hand, run in real mode, and ordinarily cannot execute from extended memory or even address that memory for storage of data. Some microprocessors can theoretically have as much as 15 MB of extended memory installed in addition to the usual 1 MB of conventional memory address space.

Microprocessors can support three different types of memory. Conventional memory is the term used for the 1 MB of linear address space that can be accessed by the microprocessor running in real mode. Expanded memory (EXP) can be made available by mapping 16 KB pages into a 64 KB space within the 1 MB of conventional memory. Extended memory (EXT) relates to that memory above 1 MB that can be directly accessed by a microprocessor running in protected mode. The memory media can, of course, include a wide variety of structures, such as ROM, RAM, floppy disks, hard disks and others.

SUMMARY OF THE INVENTION

It is one object of the present invention to provide an expanded memory interface which can be used with a variety of microprocessors in a variety of applications.

It is another object of the present invention to provide an expanded memory interface that can be used in applications requiring small size, low power and removable media such as a laptop computer.

It is another object of the present invention to provide a memory interface which can be used to support conventional, expanded and extended memory in a variety of media.

It is another object of the present invention to provide an expanded memory interface which can support both fixed and removable memory media.

It is another object of the present invention to provide a expanded memory interface in which the various memory media are treated as floppy disks by the application processor.

Another object of the present invention is to provide an expanded memory interface which allows the application processor to be controlled by an exit processor for power conservation.

It is another object of the present invention to provide an expanded memory interface in which an application processor is connected to an external processor via status ports.

It is another object of the present invention to provide an expanded memory interface by which the application processor is controlled by an external processor via an interrupt of the application processor.

It is another object of the present invention to provide a generalized communication interface between an application processor and an external processor to allow direct communication between the processors.

The expanded memory interface of the present invention includes an expanded memory controller capable of addressing up to 32 MB of RAM. The EMS address is contained in four registers each of which has twelve bits. Eleven of the bits are the high order address bits for the EMS address which together with the first 14 bits of the conventional memory provide the 25 bits required to address 32 MB of memory. The 12th bit in each register is an enable bit.

The 32 MB of EMS memory are divided into two 16 MB blocks. The first 16 MB block is provided to be occupied by expanded memory which increases the usable memory space of the processor. The first 16 MB block is provided to be occupied by eight defined "Card Slots" which may be either ROM or RAM in a variety of media suitable to the particular situation. Each "Card Slot" is coupled to a status port which contains a plurality of status change bits used to indicate the status of the "Card Slot" to the application microprocessor via the expanded memory controller. The card slots are monitored by another processor to provide status information to the application processor. The expanded memory interface and the status ports are transparent to the application processor.

Other objects and advantages may become apparent to those skilled in the art upon a reading of the following disclosure with reference to the accompanying drawings.

DETAILED DESCRIPTION OF THE PREFERRED EMBODIMENT

The present invention will be discussed herein in connection with the microcomputer shown in FIG. 1. It is to be understood however, that the present invention can be used in a variety of devices, including without limitation, application specific microprocessors, printers and other products using microprocessors needing extended or expanded memory.

Figure 1:
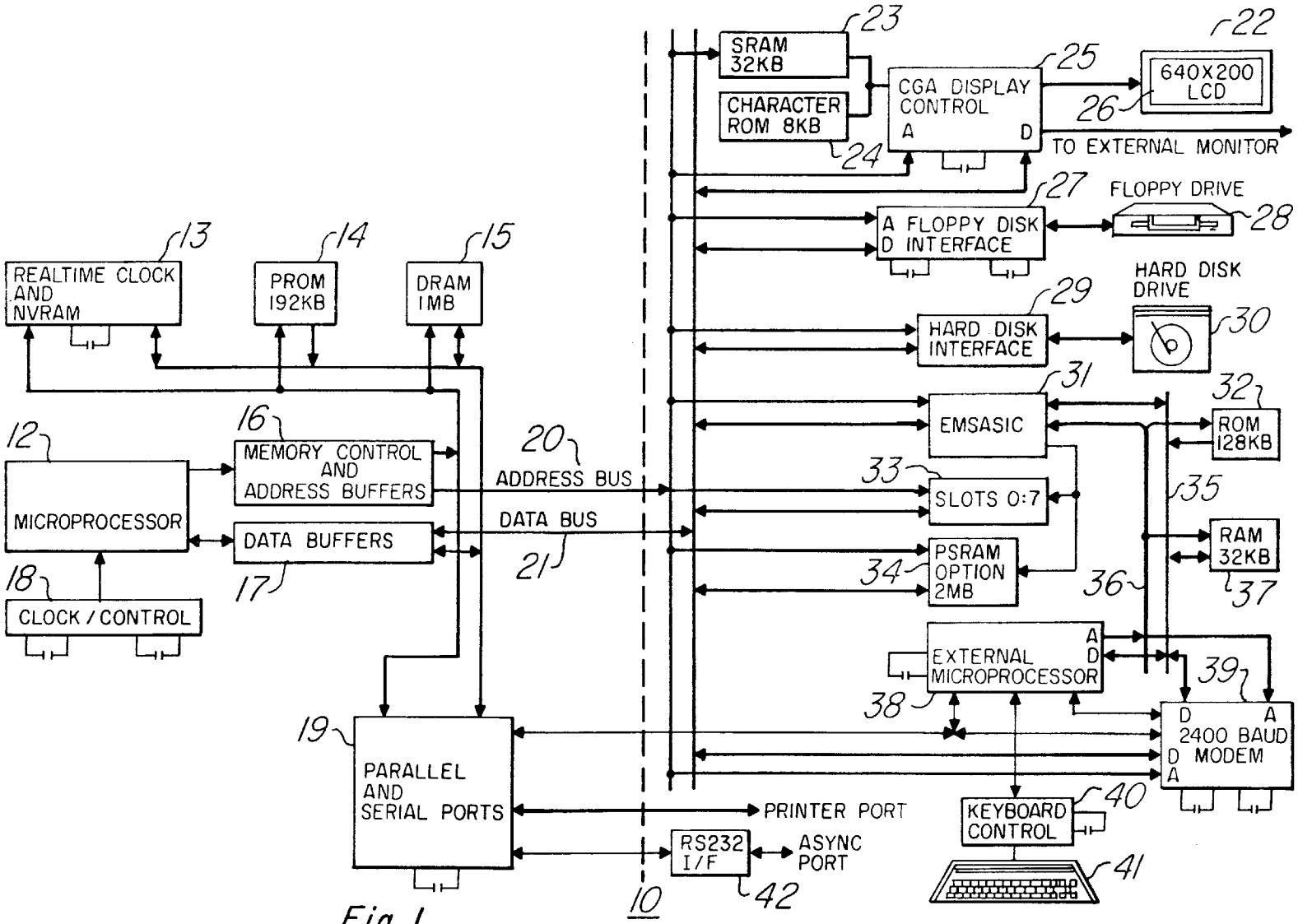
FIG. 1 is a partially schematic and partially block diagram of a microcomputer using the expanded memory interface according to the present invention.

Referring now to the microcomputer 10 shown in FIG. 1, an application processor 12, such as the 80286 processor shown, has a real time clock and NVRAM 13, programmable read only memory 14, dynamic random access memory 15, memory control and address buffers 16, data buffers 17, clock control 18 and parallel and serial ports 19 connected in a typical and known fashion. It is to be noted that while a DOS based microprocessor 80286 is shown, the present invention can be utilized with any application processor.

The main PC Board 22 of the microcomputer 10 contains the external microprocessor 38, the expanded memory interface 31 and a variety of peripherals as shown. Static RAM 23 is coupled with the address bus 20 for communication with the application processor 12. Character sets are stored in ROM 24 and coupled to the LCD 26 (off board) via CGA display control 25 for outputting information to the display 26.

The embodiment shown also has a poppy disk interface 27 connected for data communication between data bus 21, address bus 20 and floppy disk 28. A hard disk interface 29 is provided for data communication with a hard disk drive 30.

Figure 2:
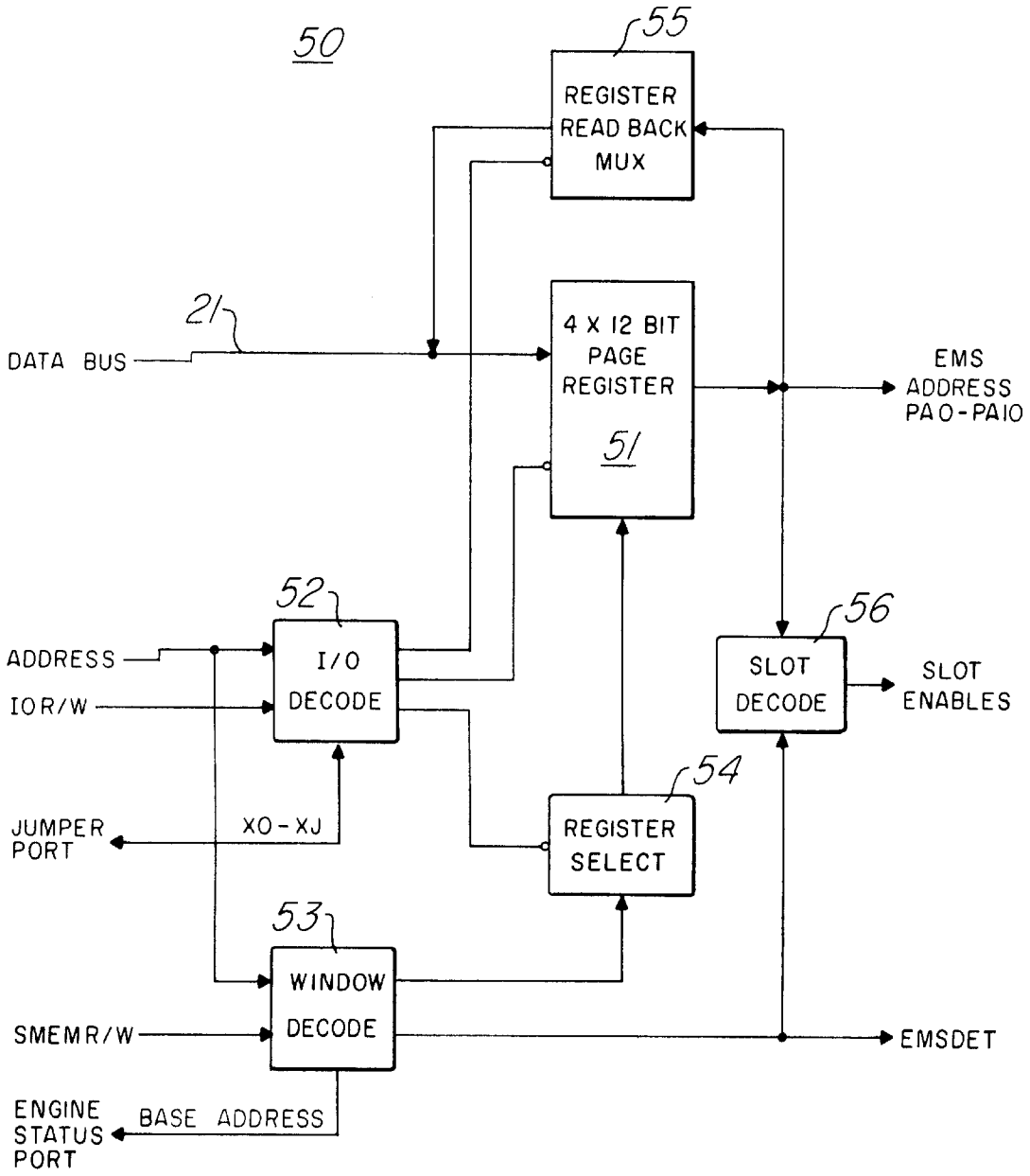
FIG. 2 is a block diagram of an expanded memory controller of the present invention used in the microcomputer of FIG. 1.
Figure 3:
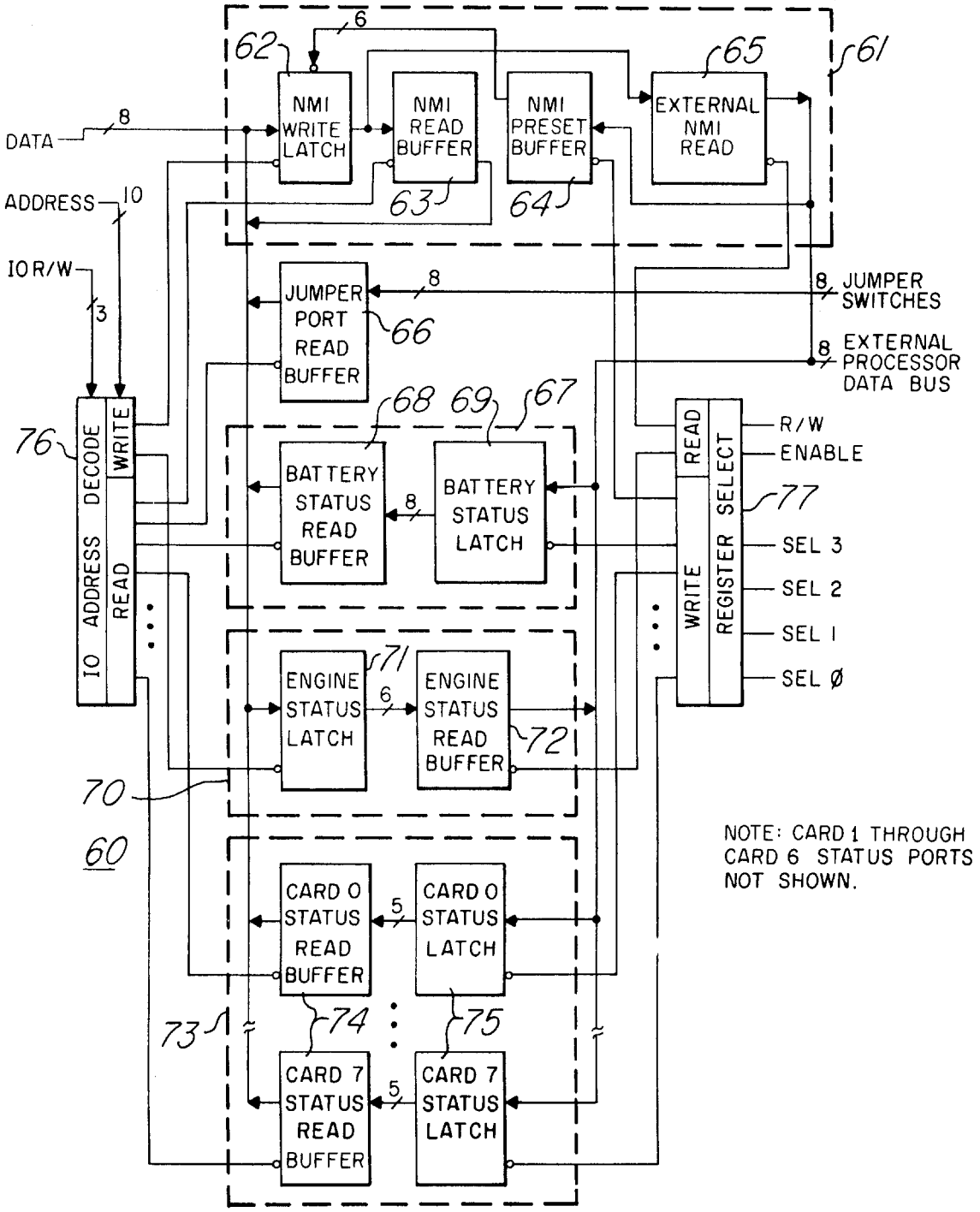
FIG. 3 is a block diagram of the status ports of the present invention used in the microcomputer of FIG. 1.

The expanded memory interface including the status ports are shown in greater detail in FIGS. 2 and 3 respectively. The expanded memory interface is resident in the expanded memory specification application specific integrated circuit EMSASIC 31, and will be discussed in further detail hereinafter. Coupled to the EMSASIC 31 are ROM 32, RAM 37, card slots 33, programmable static RAM 34 and external processor 38 which controls the expanded extended memory operations. The term "card slot" is used herein in the broad sense of any type of memory. Accordingly, RAM 32 and ROM 37 can be considered card slots.

Connected to the external microprocessor 38 is modem 39, which is also connected directly to data bus 21 and address bus 20 for communicating directly with the application microprocessor 12. Keyboard control 40 is connected to external microprocessor 38 for controlling user access to the microcomputer 10 via keyboard 41. RS232 interface 42 is also provided for connecting the parallel and serial ports 19 to an asynchronous port (not shown).

As previously stated, EMSASIC 31 contains the EMS controller 50 of FIG. 2. The EMS controller includes a 4×12 bit page register 51 for mapping the expanded memory into four 16 KB pages of the conventional memory of the application processor 12. The page register 51 receives data signals from the data bus 21 of the application processor 12 and outputs an EMS address in accordance with the output of I/O decoder 52. I/O decoder 52 receives address signals from the address bus 20 of the application processor 12 as well as an I/O read/write signal.

The address from the application processor address bus 20 is also received by the window decode register 53 together with a memory read/write signal to select one of the 4×12 bit registers in page register 51 via select register 54. A slot decode 56 is provided to enable the selected card slots 33. Register readback MUX 55 is also provided for multiplexing between slot decoder 56 and application processor data bus 21.

FIG. 3 shows the status ports 60 resident in the EVMASIC 31 which link the application processor 12 and the external processor 38. The status ports 60 include a plurality of registers which can be defined to provide a generalized communication interface between the application processor 12 and the external processor 38. The particular ports shown in FIG. 3 will now be discussed, it being understood that the configuration and function of the various ports can be changed or enhanced to meet the needs of a particular application without departing from the spirit and scope of the present invention.

The status port configuration shown allows the external processor 38 to monitor the card slots 33 and alert the application processor 12 to any change in status at the card slot. This is accomplished by the external processor 38 setting a bit in the NMI status port 61 and then toggling the non-maskable interrupt of the application processor. The application processor 12 then checks the N status port 61 to determine what general status change has occurred and accesses individual status pots 67,73 to locate the specific change in status that has occurred. After taking appropriate response steps to the change in status, the application processor 12 clears the NMI status port 61 which signals the external processor 38 that the status change has been recognized and serviced by the application processor 12.

The NMI status port 61 shown has 6 bits defined as follows:

| Bit Number | Name | Definition |
|---|---|---|
| 0 | POWER LOW | When set, signals the application processor that the application click speed should be reduced. |
| 1 | CRADLE CHANGE | When set, signals the application processor that the peripheral cradle has either been connected or disconnected |
| 2 | CARD CHANGE | When set, signals the application processor that a memory card has either been inserted or removed |
| 3 | BATTERY STATUS CHANGE | When set, signals the application processor that the battery of one of the removable battery cards has gone low |
| 4 | COPROCESSOR DISABLE | When set, signals the application processor to disable the coprocessor |
| 5 | DISPLAY READY | When set, signals the application processor that the LCD display is ready to accept data |

A second status pot contained in the interface 60 is the jumper port 66 which provides configuration information to the application processor 12. Jumper port 66 is an 8 bit register that can be set manually via jumper switches. In the embodiment shown, the bits in the jumper port 66 are defined as follows:

| | |
|---|---|
| Bits 0–3 | Define the I/O port address of the EMS address registers |
| Bit 4 | Cradle Status Bit- When low, the cradle is attached: When high, it is disconnected |
| Bits 5–7 | Define the type of LCD being used |

The present embodiment can utilize battery powered removable memory cards to be stored in some of the card slots 33. Expanded memory interface 66 also has a card battery status port 67 comprising the battery status read buffer 68 and the battery status latch 69. The card battery status port 67 is defined to contain the status of the battery of each card slot 33. The card battery status port 67 has eight bits. One bit is utilized for each card slot. When the bit is high, the battery for the memory card in that slot is good. When the bit is low, the battery in the memory card in that slot is bad.

The engine status port 70 is an 8 bit write only port with its bits defined as follows:

| | | |
|---|---|---|
| Bit 0 | STC | Written by BIOS to indicate the power on self test (POST) is complete bit is low during POST and high when complete |
| Bit 1 | VID DISABLE | Written during POST indicating that video adapter should be disabled |
| Bits 4–7 | EMS BASE ADDRESS | Written by the BIOS during POST to indictate the starting adress of the EMS window |

The eight card status ports 73 each correspond to one of the card slots. Each is an eight bit register having the following bit definitions:

| | |
|---|---|
| Bits 0–1 | Indicates whether the memory card battery for that slot is good, low or not present |
| Bit 2 | When high, indicates the presence of a card in the slot |
| Bit 3 | When high, indicates that the card cannot be written |
| Bit 7 | When high, indicates that the current NMI interupts resulted from a status change in this card |

In operation, the EMS controller 50 of FIG. 1 functions as follows. During power up, the BIOS of the application processor 12 locates an unused 64 KB "hole" in the 1 MB conventional memory of the application processor 12. The starting address of this "hole" becomes the "base address" of the EMS window and this address is written to the engine status port 70 at bits 4–7 of that port. The EMS window is divided into four 16 KB pages. Each page is physically represented by one of the 4×12 registers 51 which contain th effective EMS memory address. An EMS software driver continuously updates the page address registers 51 so that the application processor 12 "sees" the effect of a large continuous memory space.

The external microprocessor 38 monitors the various memory components and signals the application processor 12 when changes occur via the status ports 61, 67, 73 by writing bit changes to the register in the status ports. The application processor 12 is notified of any changes in status via the port 61. If, for example, a removable memory card (not shown) is inserted into card slot 4 (not shown), bit 2 of the status port associated with card slot 4 will be set high by external microprocessor 38 and the NMI port 61 would be set to signal the application processor 12 of a change in status. The application processor 12 is directed to card slot 4 by reading bit 7 of card slot 4 which indicates that a change in status of card slot 4 is the reason the current NMI interruption was sent.

While the present invention bas been described in connection with its use in a microcomputer using a DOS based application processor, it is to be understood that the present invention can be utilized with a variety of application processors in many different situations requiring expanded and/or extended memory. It will be apparent to those skilled in the art that various changes and enhancements of the disclosed embodiment can be made to accommodate particular situations in a given application without departing from the spirit and scope of the present invention.

We claim:

1. A method of interfacing an application processor with a plurality of peripheral ports, comprising the steps of:

monitoring the plurality of peripheral ports with an external processor;

communicating a status change in at least one of the plurality of peripheral ports to the application processor;

evaluating the status change with the application processor;

executing a response with the application processor in response to the status change; and communicating the status change evaluation and execution from the application processor to the external processor.

2. The method of claim 1, wherein the step of communicating a status change further comprises the step of writing a bit change to a register in the at least one of the plurality of peripheral ports.

3. The method of claim 1, wherein the step of evaluating the status change with the application processor further comprises the step of reading a plurality of bits in the at least one of the plurality of peripheral ports.

4. A method of interfacing an application processor with a plurality of peripheral ports, comprising the steps of:

monitoring the status of a plurality of peripheral ports with a processing element other than said application processor;

communicating that status change has occurred in at least one of the plurality of peripheral ports;

said application processor responding to the status change; and updating an indicator of the changed status of said at least one of the peripheral ports in said processing element.

5. The method of claim 4, wherein said processing element is a processor other than said application processor.

6. The method of claim 4, wherein the step of communicating a status change further comprises the step of writing a bit change to a register in at least one of said plurality of peripheral ports.

7. A method of interfacing an application processor with a plurality of peripheral ports, comprising the steps of:

monitoring the status of a plurality of peripheral ports with a processing element other than said application processor;

communicating to said application processor that a status change has occurred in at least one of the plurality of peripheral ports; and said application processor responding to the status change.

8. The method of claim 7, wherein the step of communicating a status change further comprises the step of writing a bit change to a register in at least one of said plurality of peripheral ports.

9. The method of claim 7, wherein said processing element is a processor other than said application processor.

10. The method of claim [7] *20*, wherein said status of at least one of said card slots changes when a card is inserted into at least one of said card slots.

11. The method of claim [7] *20*, wherein said status of at least one of said card slots chances when a card is removed from at least one of said card slots.

12. The method of claim [7] *20*, wherein said status of at least one of said card slots changes when a card is inserted into at least one of said card slots and again changes when a card is removed from at least one of said card slots.

13. The method of claim [7] *20*, wherein said application processor's response to the change in the status of at least one of said card slots is dynamic.

14. A method of interfacing an application processor with a plurality of card slots in a computing device, comprising the steps of:

monitoring said card slots in a computing device with a processing element other than said application processor;

communicating to said application processor that a change in the status of at least one of said card slots has occurred; and said application processor responding to the change in the status of at least one of said card slots.

15. The method of claim 14, wherein said processing element is a processor other than said application processor.

16. The method of claim 14, wherein said status of at least one of said card slots changes when a card is inserted into at least one of said card slots.

17. The method of claim 14, wherein said status of at least one of said card slots changes when a card is removed from at least one of said card slots.

18. The method of claim 14, wherein said status of at least one of said card slots changes when a card is inserted into at least one of said card slots and again changes when a card is removed from at least one of said card slots.

19. The method of claim 14, wherein said application processor's response to the change in the status of at least one of said card slots is dynamic.

*20. The method of claim 7, wherein at least some of said peripheral ports are card slots.*

* * * * *